United States Patent [19]

Koenig et al.

[11] Patent Number: 5,030,805
[45] Date of Patent: Jul. 9, 1991

[54] CONDENSATION HEATING APPARATUS

[75] Inventors: Timothy A. Koenig, Maplewood; John A. Pignato, Jr., Centerville; Mark W. Grenfell, Woodbury, all of Minn.

[73] Assignee: Minnesota Mining and Manufacturing Company, St. Paul, Minn.

[21] Appl. No.: 482,237

[22] Filed: Feb. 20, 1990

[51] Int. Cl.$^5$ .............................................. F22B 1/28
[52] U.S. Cl. ........................................ 219/401; 34/78
[58] Field of Search ............... 219/401, 521; 392/403; 34/77, 78

[56] References Cited

U.S. PATENT DOCUMENTS

| Re. 30,399 | 9/1980 | Ammann et al. | 228/180 R |
|---|---|---|---|
| 3,762,872 | 10/1973 | Acree | 8/176 |
| 3,866,307 | 2/1975 | Pfahl, Jr. et al. | 29/498 |
| 3,947,240 | 3/1976 | Pfahl, Jr. | 432/28 |
| 4,032,033 | 6/1977 | Chu et al. | 228/200 |
| 4,090,843 | 5/1978 | Chu et al. | 432/197 |
| 4,115,601 | 9/1978 | Ammann et al. | 427/96 |
| 4,146,166 | 3/1979 | Bankes et al. | 228/180 R |
| 4,187,974 | 2/1980 | Mahajan | 228/242 |
| 4,194,297 | 3/1980 | Pfahl, Jr. | 34/26 |
| 4,238,186 | 12/1980 | Pfahl, Jr. | 432/10 |
| 4,348,174 | 9/1982 | Spigarelli | 34/78 |
| 4,517,356 | 5/1985 | Lambert et al. | 528/483 |
| 4,634,000 | 1/1987 | Plapp | 34/77 |
| 4,841,645 | 6/1989 | Bettcher | 34/78 |

OTHER PUBLICATIONS

3M Technical Bulletin No. 98-0211-2168-0 "Curing Polymer Thick Film Inks by Vapor Phase Condensation Heating".
3M Bulletin Y-INRDP, "Vapor Phase Soldering with Perfluorinated Inert Fluids".

Primary Examiner—Teresa J. Walberg
Attorney, Agent, or Firm—Gary L. Griswold; Walter N. Kirn; James D. Christoff

[57] ABSTRACT

A condensation heating apparatus particularly useful for curing abrasion resistant coatings on eyeglass lenses has an open topped chamber with a baffle assembly for reducing the loss of vapor through the open top. The baffle assembly includes a fixed vertical partition and a removable, L-shaped baffle that has a horizontal portion to cover part of the chamber and a vertical portion which also serves as a partition. The baffle assembly extends only partially into the chamber and terminates above the top of the vapor zone so that the assembly does not become hot to the touch.

8 Claims, 4 Drawing Sheets

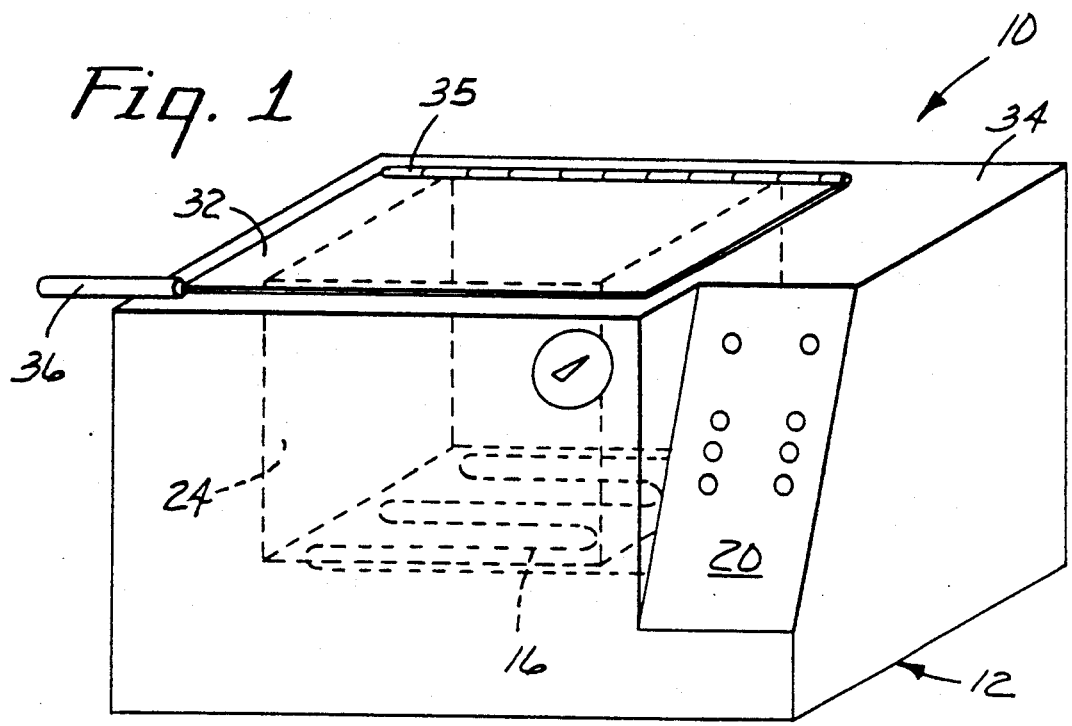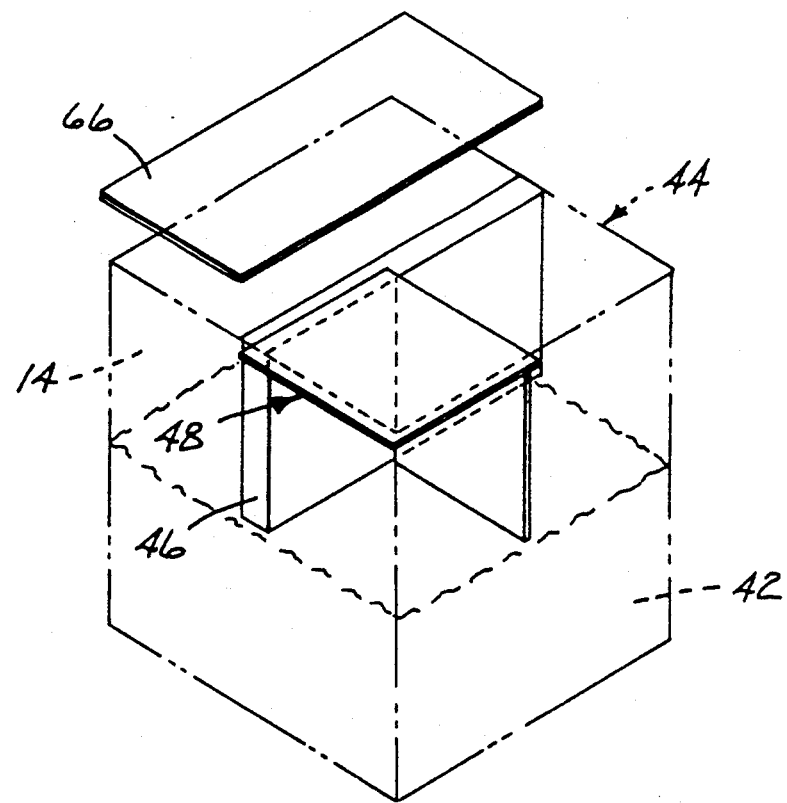

CONDENSATION HEATING APPARATUS

BACKGROUND OF THE INVENTION

1. Field of the Invention

This invention relates to batch-type apparatus for heating a workpiece by vapor phase or condensation heating.

2. Description of the Related Art

Condensation heat transfer is known to be extremely effective for heating a variety of articles for purposes of curing, soldering, brazing and the like. Typical condensation heating apparatus includes a chamber containing a heat transfer liquid and a heater near the bottom of the chamber to boil the liquid and establish a saturated vapor zone directly above the liquid. As a workpiece cooler than the boiling liquid enters the vapor zone, the vapor surrounds and condenses on external surfaces of the workpiece. During this phase change, the latent heat stored in the vapor is transferred to the workpiece, providing thermal energy in order to carry out the curing, soldering, brazing or other desired operation. Additional technical information relating to condensation heat transfer may be obtained from 3M Technical Bulletins No. 98-0211-2168-0.

Condensation heating apparatus for batch-type operations often has a chamber with an open top for receiving the article or workpiece to be processed. Conventional apparatus includes cooling coils extending horizontally around the perimeter of the chamber at a location directly above the desired upper boundary of the vapor zone and below the chamber top in order to establish and maintain a layer of cool air. In practice, most of the vapor remains in the vapor zone at the lower part of the chamber below the layer of cool air and does not rise and escape through the open top, since the heat transfer liquid that is normally selected yields a vapor substantially denser than air.

If, for some reason, the vapor zone is disturbed, a portion of the vapor moving past the horizontal plane of the perimeter cooling coils tends to condense on the sidewalls of the chamber and then descend toward the liquid at the bottom of the chamber. In addition, the cool air layer tends to reduce the amount of vapor that might otherwise escape, although such phenomena are most efficient in areas adjacent the sidewalls near the cooling coils. However, it is important to reduce the quantity of vapors escaping from the chamber as much as practicable in order reduce the cost of replenishing the heat transfer liquid.

A number of factors can affect usage rates of the liquid, including the power setting of the heater, the velocity of room air currents in the vicinity of the open-topped chamber, the configuration of the workpiece to be heated, and the quantity of condensation clinging to the workpiece as the latter is taken out of the vapor zone. Some factors, however, cannot readily be changed. For example, the chamber of the batch condensation heating apparatus is normally fixed in size and may be much larger than a size that would adequately heat smaller workpieces or only a few workpieces, resulting in inefficiency due to the possibility of escape of vapors in a middle portion of the chamber away from the cooling coils.

Recently, there has been increased interest in utilizing condensation heating apparatus for curing of polysiloxane coatings on plastic eyeglass lenses such as those made of polycarbonate materials. In the past, retail optical stores have not typically offered "one hour" service for prescription eyewear that includes a thermally cured abrasion resistant coating because such coatings are typically cured in an air oven for a period of 2 to 4 hours. Vapor condensation heating apparatus is useful for such retailers because the curing time of polysiloxane coatings on lenses may be significantly reduced to a time on the order of about four to forty minutes.

SUMMARY OF THE INVENTION

The present invention is directed toward a condensation heating apparatus comprising a housing having a chamber for receiving a heat transfer liquid wherein the chamber has a bottom, upright sidewalls and an open top. A heater is associated with the chamber for forming a vapor by heating the heat transfer liquid in the chamber to its boiling point. Cooling structure is positioned next to the chamber sidewalls at a height between the bottom and the top for condensing vapor rising toward the top. Importantly, an upright baffle is connected to the housing and is located in the chamber for reducing convective loss of vapor rising past the top. The baffle has a lower end located at a height approximately equal to the height of the cooling structure and extends upwardly toward the top.

The baffle in the chamber functions to reduce the possibility that room air currents might enter and disturb the vapor zone as the currents pass across the open top of the chamber. In addition, the baffle tends to stabilize movement of air in the chamber above the vapor zone so that localized air currents caused by raising or lowering workpieces into or out of the vapor zone are confined to the portion of the chamber bounded by the baffle and the chamber sidewalls, and so that the air in other parts of the chamber and corresponding underlying portions of vapor zone are not disturbed by the work operation. Advantageously, the baffle remains cool to the touch because the bottom of the baffle terminates above the top of the vapor zone.

BRIEF DESCRIPTION OF THE DRAWINGS

FIG. 1 is a front, top and right side perspective view of condensation heating apparatus according to the invention;

FIG. 2 is an enlarged front, top and left side perspective view of a chamber of the apparatus shown on FIG. 1, illustrating a baffle assembly of the invention;

FIG. 3 is a fragmentary plan view of the apparatus illustrated in FIG. 1, showing a removable rack received in one portion of the chamber for holding a pair of eyeglass lenses;

FIG. 4 is a fragmentary sectional view, in elevation, of the apparatus shown in FIG. 1 and illustrating the chamber and baffle assembly shown in FIGS. 2-3;

DESCRIPTION OF THE PREFERRED EMBODIMENT

Figure 5:
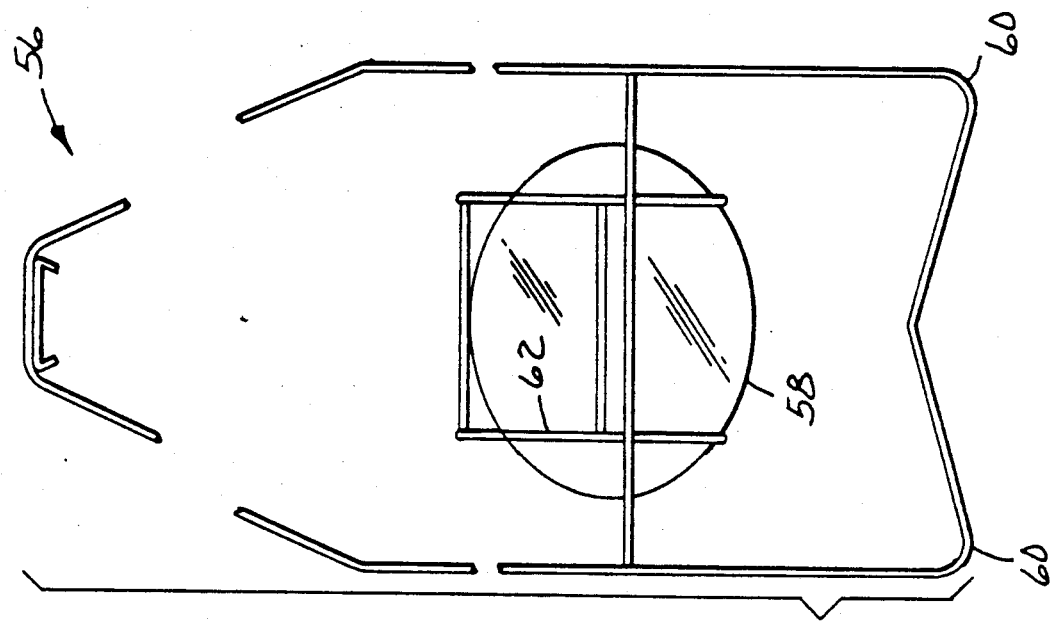
FIG. 5 is an enlarged, fragmentary, front elevational view of the rack and lenses illustrated in FIG. 3.

A condensation heating apparatus 10 as shown in FIG. 1 includes a housing 12 with an internal chamber 14 that is also shown in FIGS. 2-4. An elastomeric mat heater 16 having embedded resistance heating elements is connected by adhesive or vulcanized to the underside of the chamber 14 for forming a vapor by heating a heat transfer liquid 18 (FIG. 4) in the chamber 14 to its boiling point. Energization of the heater 16 is carried out by an electrical control system that includes an operator panel 20 on the front of the housing 12.

The chamber 14 is rectilinear in both plan and elevational view, and is bounded by a horizontal bottom 22 (FIG. 4), two parallel, vertical, spaced apart end sidewalls 24, a vertical front sidewall 26 (FIG. 3) and a vertical rear sidewall 28. The sidewalls 26, 28 are parallel to each other and perpendicular to the end sidewalls 24 as well as the bottom 22. The chamber 14 has an open top 30 (FIG. 4) that may be covered between curing operations by a flat lid 32 (FIG. 1). A piano hinge 35 connects the lid 32 to the housing 12 and, as shown in FIG. 1, the lid 32 extends beyond the perimeter of the chamber top 30 when the lid 32 is closed and rests on an upper, flat, horizontal panel 34 of the housing 12. The lid 32 includes a handle 36 for moving the lid 32 between an open and closed position.

A cooling structure 38 (FIG. 4) includes a U-shaped channel 40 that extends around the periphery of the chamber 14 in a horizontal plane that is spaced approximately midway between the bottom 22 and the top 30. The channel 40 is connected to the external side of the sidewalls 24, 26, 28 so that the sides of the latter facing the chamber 14 are smooth and continuous. The channel 40 is connected to a coolant source or tap water supply by piping which includes a solenoid valve interconnected with the control system.

Preferably, the heat transfer liquid 18 comprises an inert, stable, non-flammable fluorinated fluid having a boiling point in the range of about 80° C. to about 140° C. in order to cure protective thermosetting resins such as polysiloxane on glass or plastic lenses such as polycarbonate (e.g., CR-39, the polymer from diethylene glycol bis(allylcarbonate)), or polyurethane (although the apparatus 10 can also be used for drying, annealing and curing other materials as well). Suitable fluorinated fluids are preferably perfluorinated organic compounds having 7 to 10 carbon atoms and include perfluoralkanes, perfluoroalkyl amines, perfluoroalkyl ethers and perfluoroaminoethers. Specific suitable perfluorinated fluids include perfluoroheptane, perfluorononane, perfluorotripropylamine, perfluorodibutyl ether, perfluoro-4-isopropylmorpholine, and related materials and mixtures thereof.

As shown in FIG. 4, energization of the heater 16 boils the liquid 18 to establish a zone 42 of hot saturated vapor that is denser than air. The top of the vapor zone 42, for the most part, is defined by the height of the horizontally extending cooling structure 38, and a zone of cooler, atmospheric air is thus established above the zone 42. If, however, the vapor zone 42 is disturbed by air currents or movement of workpieces in and out of the zone 42, the cooling structure 38 will cause a portion of the vapor rising past the structure 38 to condense on the sidewalls 24, 26, 28 next to channel 40 and descend toward the liquid 18 in the bottom 22 of the chamber 14.

The control system initiates flow of tap water through the channel 40, in once-through fashion, when the apparatus 10 is activated and a timer of the control system enables the water to run for a few minutes after the apparatus 10 is deactivated before the solenoid valve is closed. The control system thus insures that a vapor zone will not be formed unless the cooling system is in operation, so that significant amounts of vapor are not lost.

A baffle assembly 44, as shown in FIGS. 2-4, includes a vertical partition 46 that interconnects the end sidewalls 24 at a location spaced from the front sidewall 26 and rear sidewall 28. The partition 46 is perpendicular to the sidewalls 24 and terminates flush at its upper end with the top panel 34 of the housing 12. A lower end of the partition 46 terminates at a height approximately equal to the height of the cooling structure 38. More specifically, the lower end of the partition 46 is horizontal with the top of the channel 40 and is spaced slightly above the top of the vapor zone 42 (which is approximately horizontal with the vertical mid-point of the channel 40).

The baffle assembly 44 also includes a removable, L-shaped wall or baffle 48 having a vertical portion 50 and a horizontal portion 52. Referring to FIG. 4, the baffle 48 has a lower end 54 that terminates at a height equal to the lower end of the partition 46 and equal to the height of a horizontal reference plane passing through the perimeter cooling structure 38. The vertical portion 50 extends upwardly toward the top 30 and is located in parallel, spaced relation to both of the end sidewalls 24.

The horizontal portion 52 of the baffle 48 is wider than the adjoining vertical portion 50, and advantageously lays on the flat, horizontal top of the partition 46 as well as terminal edge sections of the panel 34 adjacent the chamber 14. The baffle 48 may be made by bending an appropriately sized sheet of stainless steel or aluminum. The baffle 48 may be readily lifted from the chamber 14 when desired, and put back in place in the chamber 14 for use. Flat contact of the horizontal portion 52 with the top of the partition 46 and adjoining sections of the panel 34 insures that the portion 50 will assume a vertical orientation, with its end 54 spaced above the top of the vapor zone 42.

Figure 6:
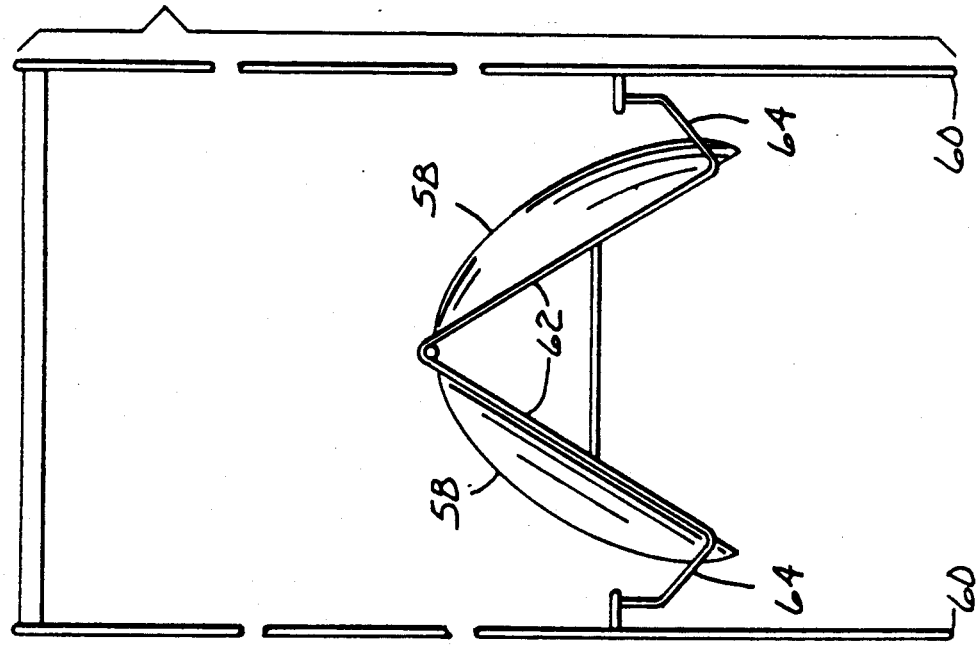
FIG. 6 is a fragmentary, side elevational view of the rack and lenses depicted in FIG. 5.
Figure 7:
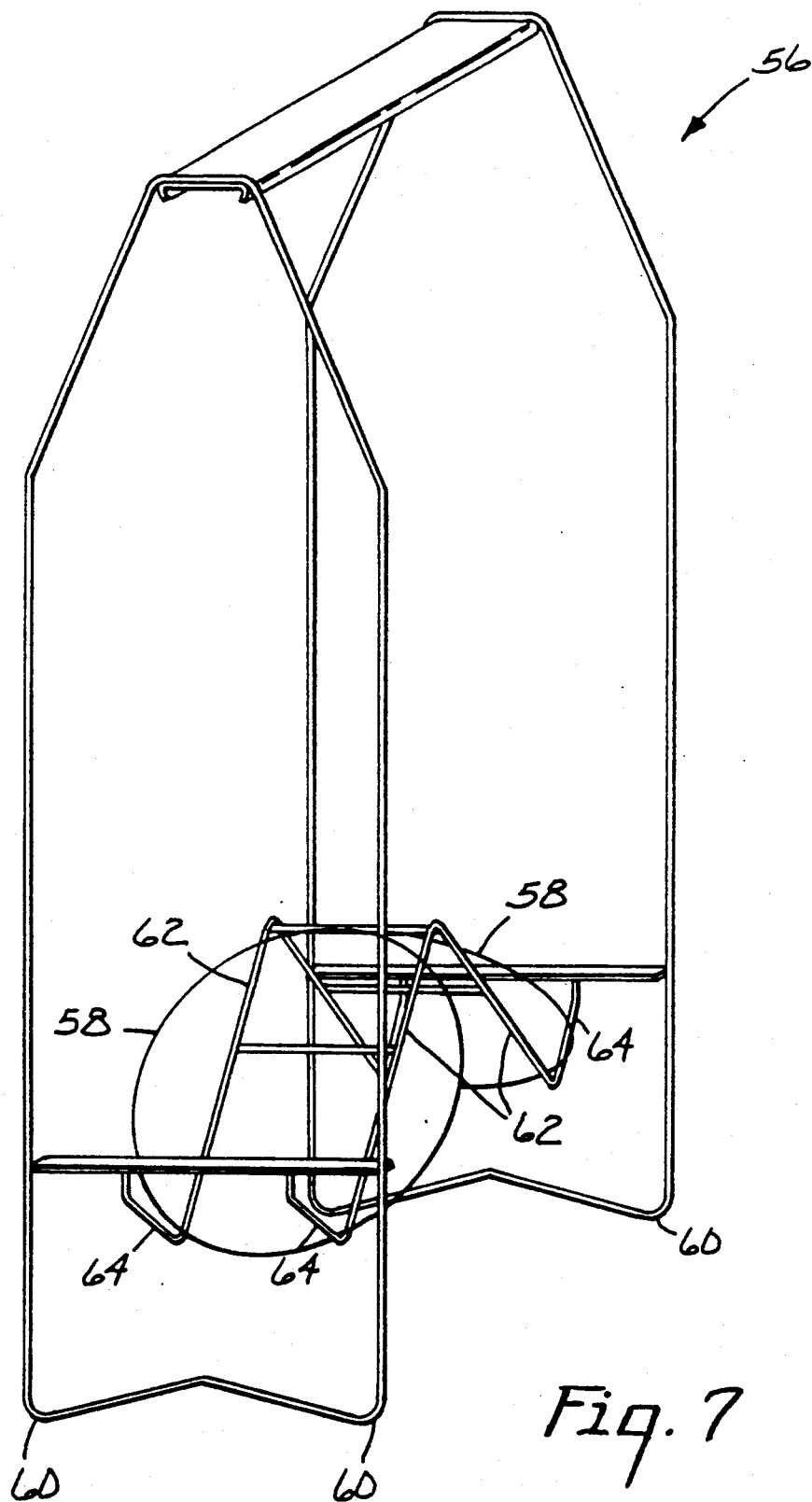
FIG. 7 is a front, top and right side perspective view of the rack and lenses shown in FIGS. 5-6.

A rack 56, as shown in FIGS. 3 and 5-6, is useful for lowering workpieces such as eyeglass lenses 58 (FIG. 3) into the vapor zone 42. The rack 56 is made of wire stock which is formed to present four legs 60 and a pair of oppositely inclined supports 62, each having a foot or stop 64. Normally, the curvature of each lens 58 is such that the supports 62 contact the respective lens 58 at only four peripheral locations so as not to disturb the lens coating.

Preferably, the supports 62 extend upwardly from respective stops 64 at an angle which is in the range of about 45° to 75° from horizontal, and more preferably an angle which is about 60° relative to horizontal. It has been observed that inclination of the supports 62 in the foregoing manner helps avoid undue collection of condensation on the back or concave side of the lens which might otherwise run off and impair the uniformity of the coating thereon. Also, inclination of the lenses avoids excessive disturbance of the vapor zone 42 as the rack 56 is moved into or out of the chamber 14.

If only a small area of the chamber 14 is desired for use, the operator opens lid 32 and places a cover 66 (FIGS. 2-4) over a rear portion of the top 30 of the chamber 14 such that the cover 66 rests on the top of the partition 46 as well as adjoining sections of the panel 34 bordering the chamber 14. If the resulting open portion of the chamber 14 is still larger than the space desired for curing, the operator places the baffle 48 in the position shown in FIGS. 2-4. In this fashion, only about one-fourth of the top 30 of the chamber 14 is exposed to the atmosphere when the lid 32 is open, substantially preventing the escape of vapor from the zone 42 in areas of the chamber 14 directly below the cover 66 and horizontal portion 52 of baffle 48.

In use, the operator activates the apparatus 10 by means of control panel 20 which causes heater 16 to be energized and also initiates the flow of water through cooling channel 40. Lid 32 is kept in a closed position until such time as the liquid 18 is continuously boiling and vapor zone 42 is established. Next, the coated lenses 58 are placed on the supports 62 such that they come to rest against respective stops 64, and the rack 56 is lowered through the uncovered portion of the top 30 in the manner illustrated in FIG. 3. The legs 60 guide the rack 56 during its descent until legs 60 contact the chamber bottom 22. In this position of the rack 56, the lenses 58 in their entirety are within the vapor zone 42 and the saturated vapor quickly heats the lenses 58 and the coatings thereon until such coatings have fully cured. Advantageously, the overall configuration of the rack 56 closely matches the configuration of the chamber 14 so that the rack 56 cannot tip in the chamber 14 to such an extent that the lenses 58 might fall off of the supports 62. Although not shown, another rack, larger than rack 56, may be provided for use when baffle 48 is removed from chamber 14; such as larger rack could hold multiple pairs of lenses and could be of a size adapted to closely match the open area of the chamber 14 between the partition 46 and appropriate sidewalls 24, 26, 28.

A timer of the control panel 20 alerts the operator when sufficient time has elapsed to cure the coating on the lenses 58. At such time, the operator lifts the rack 56 from the chamber 14 and closes the lid 32 or, alternatively, places other lenses on the rack 56 for insertion and curing in the vapor zone 42. If simultaneous curing of more than one pair of lenses at any given time is desired, the operator may remove the baffle 48 so that the chamber 14 may receive two racks. Alternatively, the operator may also remove cover 66 in order to place four racks similar to rack 56 in the chamber 14.

The baffle assembly 44 reduces the amount of vapor that otherwise might be lost from zone 42, so that less liquid is needed to periodically replenish the liquid 18 in the chamber 14. The vertical partition 46 and the vertical portion 50 of the baffle 48 function to reduce the likelihood that air currents sweeping across the top 30 of the chamber 14 will disturb the zone 42. Moreover, since the open portion of the chamber top 30 is closely similar in size to the horizontal cross-sectional area of the rack 56 (see, e.g., FIG. 3), there is minimal disturbance of the vapor zone 42 as the rack 56 is moved in or out of the chamber 14.

Referring to FIG. 4, the baffle assembly 44 stops short of the vapor zone 42 such that a small space is normally present between the top of the zone 42 and the bottom of the partition 46 and the baffle 48. As a consequence, the partition 46 and the baffle 48 remain cool to the touch and heat injury to the operator from the baffle assembly 44 is normally avoided. Such construction also facilitates easy removal or insertion of the baffle 48 as desired.

We claim:

1. Condensation heating apparatus comprising:
   a housing having a chamber for receiving a heat transfer liquid, said chamber having a bottom, upright sidewalls and an open top;
   a heater associated with said chamber for forming a vapor by heating the heat transfer liquid in said chamber to its boiling point;
   cooling structure positioned next to said sidewalls of said chamber at a certain height between said bottom and said top for condensing vapor rising toward said top; and
   an upright baffle connected to said housing and located in said chamber for reducing convective loss of vapor rising past said top, said baffle having a lower end located at a height approximately equal to said certain height of said cooling structure and extending upwardly toward said top.

2. The apparatus of claim 1 wherein said baffle includes a horizontal portion for covering a portion of said top.

3. The apparatus of claim 2 wherein said baffle is substantially L-shaped and said horizontal portion rests on said housing adjacent said top of said chamber.

4. The apparatus of claim 1 wherein said baffle is removably connected to said housing.

5. The apparatus of claim 1; and including a rack presenting an overall configuration in horizontal section that is approximately equal to a portion of said chamber between said baffle and said sidewalls.

6. The apparatus of claim 5, wherein said rack is adapted to support eye glass lenses in spaced relation to said sidewalls of said chamber.

7. The apparatus of claim 1, wherein said heater comprises a flexible mat heater connected to said chamber bottom.

8. The apparatus of claim 1; and including a control system having means for initiating the flow of coolant through said cooling structure when said heater is energized.

* * * * *